United States Patent [19]

Bainbridge et al.

[11] Patent Number: 4,627,301
[45] Date of Patent: Dec. 9, 1986

[54] CHANGE SPEED TRANSMISSION

[75] Inventors: Wilfred N. Bainbridge, Banbury; Alastair J. Young, Kenilworth, both of United Kingdom

[73] Assignee: Automotive Products plc, Leamington Spa, England

[21] Appl. No.: 713,284

[22] Filed: Mar. 18, 1985

[51] Int. Cl.[4] ............................................. F16H 3/08
[52] U.S. Cl. ...................................... 74/333; 74/358; 74/359
[58] Field of Search ................. 74/329, 357, 358, 359, 74/360, 333

[56] References Cited

U.S. PATENT DOCUMENTS

| | | | |
|---|---|---|---|
| 2,543,412 | 2/1951 | Kegresse | 74/331 X |
| 4,476,737 | 10/1984 | Young | 74/333 X |

FOREIGN PATENT DOCUMENTS

| | | | |
|---|---|---|---|
| 0090674 | 10/1983 | European Pat. Off. | |
| 0118355 | 7/1983 | Japan | 74/330 |
| 2095775 | 3/1981 | United Kingdom | |
| 2070158 | 9/1981 | United Kingdom | 74/359 |
| 2103317 | 2/1983 | United Kingdom | |
| 2107805 | 5/1983 | United Kingdom | |
| 2112088 | 7/1983 | United Kingdom | |
| 2117462 | 10/1983 | United Kingdom | |
| 0647152 | 2/1974 | U.S.S.R. | 74/329 |

Primary Examiner—Lawrence Staab
Assistant Examiner—Martin G. Belisario
Attorney, Agent, or Firm—Solon B. Kemon

[57] ABSTRACT

A transmission comprises gear trains which provide increasing speed ratios and two clutches which are operable independently to provide alternative paths through the gear trains between an input and an output. The gear trains provide alternate ratios driven respectively through one and the other clutch. The input comprises a first shaft drivable by one clutch and a shaft drivable by the other clutch. A layshaft is provided through which drive in a selected ratio is transmitted from one of the first and second shafts to the other to drive the output which is also a shaft. One of the first and second shafts has a gear thereon which meshes with a gear on the output shaft.

11 Claims, 4 Drawing Figures

CHANGE SPEED TRANSMISSION

The invention relates to a change speed transmission preferably for a vehicle. In particular the transmission is of the dual clutch kind including gear trains which provide increasing speed ratios and two clutches which are independently operable and provide alternative drive paths through the gear trains between an input and an output, the gear trains providing alternate ratios driven respectively through one and the other clutch.

In order to fit gearboxes into restricted spaces in modern vehicles it is desirable to keep the transmission as small as possible and an object of the invention described below is to provide a transmision which will provide a number of speed ratios using relatively few components.

According to the invention there is provided a change speed transmission including gear trains which provide increasing speed ratios and two clutches which are independently operable and provide alternative drive paths through the gear trains between an input and an output, the gear trains providing alternate ratios driven respectively through one and the other clutch said input comprising a first shaft drivable by one clutch and a second shaft drivable by the other clutch, a layshaft being provided through which drive in a selected ratio is transmitted from one of the first and second shafts to the other to drive the output, one of the first and second shafts having a gear thereon which meshes with a gear on the output.

Preferably gears rotatably fast with the first shaft and the layshaft are in constant mesh. In such case the gear fast with the first shaft may be in constant mesh with a gear selectively drivably connectable to said output.

Gears on the second shaft may be in constant mesh with gears which are selectively drivably connectable to said layshaft.

The gears on the second shaft may be in constant mesh with gears selectively connectable to said output.

In one embodiment a reverse ratio gearing is provided comprising a gear on the second shaft which in reverse ratio meshes with a lay gear in mesh with a gear on the output. In another embodiment the reverse ratio gearing comprises a reverse gear on the the layshaft, the reverse gear being in constant mesh with a lay gear which constantly meshes with a gear rotatably fast with said first shaft.

Preferably the reverse gear is selectively drivably connectable to a further gear on the layshaft. In such a case said further gear meshes constantly with a gear on said second shaft.

Three examples of transmissions in accordance with the invention are shown in the accompanying drawings in which.

Figure 1:
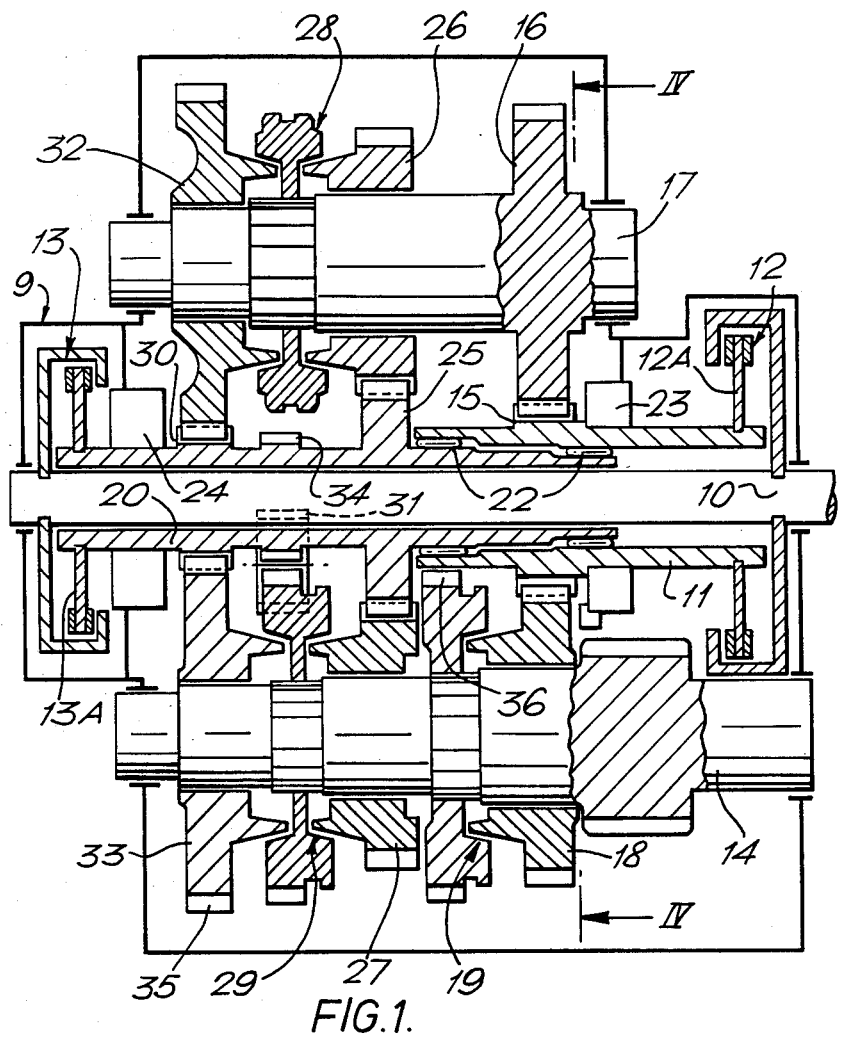
FIG. 1 is a schematic illustration of one embodiment of a five speed constant mesh transmission.

In FIG. 1 an output shaft 10 from an engine (not shown) is connectable through two clutches 12, 13 and trains of gear wheels to an output shaft 14.

The output shaft 14 is for connection to driving wheels of a vehicle through the usual differential gearing.

The clutch 12 has a driven member 12A fast with a hollow shaft 11 which is fast with a gear 15. The gear 15 meshes with a gear 16 fast with a lay shaft 17 and a further gear 18 rotatably mounted on the output shaft 14 and selectively drivably connectable thereto bya synchronizer assembly 19.

The hollow shaft 11 is concentric with a further hollow shaft 20 fast with a driven member 13A of clutch 13. Roller bearings 22 are interposed between the two hollow shafts 11, 20, the shafts being rotatable in respective bearings 23, 24 mounted on a casing 9 for the transmission.

The hollow shaft 20 is fast with a gear 25 which meshes with a gear 26 on the layshaft 17 and a gear 27 on the output shaft 14. The gears 26, 27 can be selectively drivably connected to their associated shafts by respective synchronizer assemblies 28, 29. The hollow shaft 20 is also fast with a gear 30 which meshes with a gear 32 on layshaft 17 and a gear 33 on output shaft 14. The gears 32, 33 can be selectively drivably connected to their associated shafts by the respective synchronizer assemblies 28, 29. The hollow shaft 20 is also fast with a gear 34 which drives a gear 35 forming part of the synchronizer assembly 29 through a lay gear 31. The synchronizer assembly 29 is rotatably fast with the output shaft 14 so that gears 34, 35 and the intermediate lay gear 31 provide a reverse ratio.

The synchronizer assembly 19 includes splines 36 which co-operate with a pawl or the like not shown to provide a parking lock.

Operation of the transmission is as follows:

With the engine running, both clutches 12, 13 are initially disengaged and the synchronizer assemblies 19, 28 and 29 are also initially disengaged.

To move off from rest in first ratio synchronizer assembly 28 is shifted to engage gear 26, synchronizer assembly 29 is shifted to engage gear 33 and clutch 12 is engaged. The output shaft 14 is then driven through gears 15, 16; 26, 25 and 30, 33.

To engage second ratio clutch 13 is engaged at an appropriate time and clutch 12 disengaged so as to drive output shaft 14 through gears 30, 33. Synchronizer assembly 19 is shifted to engage gear 18 to preselect third ratio.

Third ratio is obtained by engaging clutch 12 and disengaging clutch 13 to drive the output shaft 14 through gears 15, 18. Fourth ratio is pre-selected by shifting synchronizer assembly 29 to engage gear 27.

Fourth ratio is obtained by engaging clutch 13 and disengaging clutch 12 to drive output shaft 14 through gears 25, 27. Fifth ratio is pre-selected by shifting the synchronizer assembly 28 to engage gear 32.

Fifth ratio is obtained by engaging clutch 12 and disengaging clutch 13 to drive the output shaft 14 through gears 15, 16; 32, 30; 25, 27.

Reverse ratio is selected by shifting the unshown lay gear into mesh with the gears 34, 35.

Figure 2:
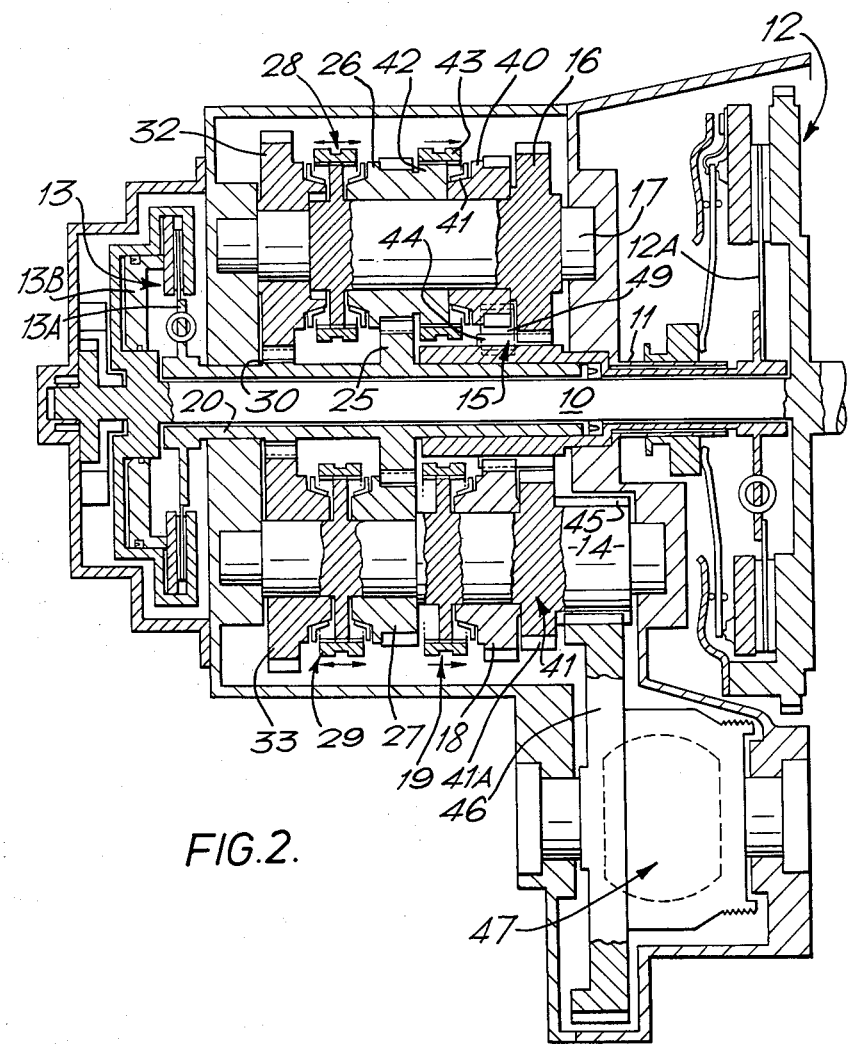
FIG. 2 is a view similar to FIG. 1 illustrating modified version of FIG. 1 transmission.

FIG. 2 illustrates in more detail a modified version of the gearbox shown in FIG. 1 and corresponding parts in FIGS. 1 and 2 carry the same reference numerals. First to fifth ratios are selected using the same operational sequence of clutches and synchronizer assemblies as the FIG. 1 gearbox.

However, unlike FIG. 1 the reverse gear indicated at 40 is rotatably mounted on the layshaft 17 and can be selectively drivably connected to a splined section 42 of gear 26 by a selector sleeve 43 via a synchronizer ring 41. The gear 40 is driven from an extension 44 of gear 15 through a lay gear 49 which is in constant mesh with the extension 44 and gear 40.

To select reverse ratio, the sleeve 43 is shifted to the right to engage gear 40 and synchronizer assembly 29 is shifted to engage the gear 33. With clutch 12 engaged drive is transmitted through gear 15, the lay gear 49, gear 40, gear 26, gear 25, gear 30 and gear 33 to output shaft 14.

FIG. 2 shows the way in which a drive output gear 45 fast with the output shaft 14 meshes with an input gear 46 of a differential gearing 47.

FIG. 2 also shows clutch 12 as a single plate dry clutch and clutch 13 as wet clutch having a piston 13B. The transmission of FIGS. 1 and 3 could use the same arrangement of clutches.

A wheel 41 on shaft 14 includes splines 41a which co-operate with a pawl or the like (not shown) to provide a parking lock.

Figure 3:
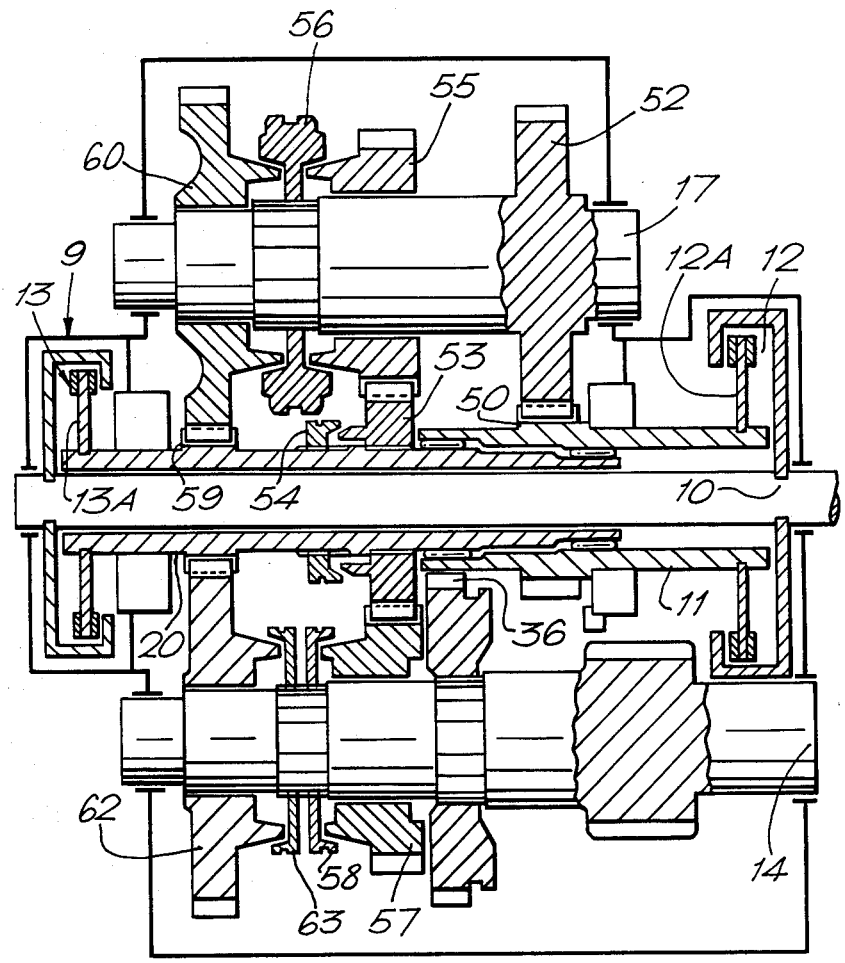
FIG. 3 is a view similar to FIGS. 1 and 2 ilustrating an alternative five speed transmission.

Reference is now made to FIG. 3 where the input shaft, output shaft, clutches, hollow shafts and layshaft carry the same reference numerals as corresponding parts in FIGS. 1 and 2.

The hollow shaft 11 is rotatably fast with a gear 50 which meshes with a gear 52 rotatably fast with the layshaft 17.

The hollow shaft 20 carries a gear 53 which is selectively drivably connectable to the shaft 20 by a synchronizer assembly 54. The gear 53 meshes with a gear 55 which is selectively drivably connectable to the layshaft 17 by a synchronizer assembly 56. The gear 53 also meshes with a gear 57 which is selectively drivably connectable to the output shaft 14 by a synchronizer assembly 58. The shaft 20 is rotatably fast with a further gear 59 which meshes with a gear 60 selectively drivably connectable by synchronizer assembly 56 to the layshaft 17. The gear 59 also meshes with a gear 62 which is selectively drivably connectable to the output shaft 14 by a synchronizer assembly 63 which is operable independently of synchronizer assembly 58.

Operation of the FIG. 3 gearbox is as follows.

To move off from rest in first ratio, synchronizer assembly 56 is shifted to engage gear 55, synchronizer assembly 54 is shifted to engage gear 53, snychronizer assembly 63 is shifted to engage gear 62 and clutch 12 is engaged to transmit drive through gears 50, 52; 55, 53; and 59, 62 to output shaft 14.

Second ratio is obtained by engaging clutch 13 and disengaging clutch 12 to transmit drive to output shaft 14 through gears 59, 62. Third ratio is pre-selected by shifting synchronizer assembly 58 to engage gear 57. Synchronizer assembly 54 is disengaged from gear 53 in second ratio.

Third ratio is obtained by engaging clutch 12 and disengaging clutch 13 to transmit drive to the output shaft through gears 50, 52 and 55, 53, 57. Synchronizer assembly 63 is disengaged from gear 62 in third ratio. Fourth ratio is pre-selected by shifting synchronizer assembly 54 into engagement with gear 53.

Fourth ratio is obtained by engaging clutch 13 and disengaging clutch 12 to drive the output shaft 14 through gears 53, 57. Synchronizer assembly 56 is shifted to engage gear 60 to pre-select fifth ratio.

Fifth ratio is obtained by engaging clutch 12 and disengaging clutch 13 to drive the output shaft through gears 50, 52; 60, 59; and 53, 57.

Reverse ratio can be obtained substantially as shown in FIG. 1 to co-operate with gear teeth on one of the synchronizer assemblies 58, 63 or substantially as shown in FIG. 2 to provide a constant mesh reverse arrangement.

Figure 4:
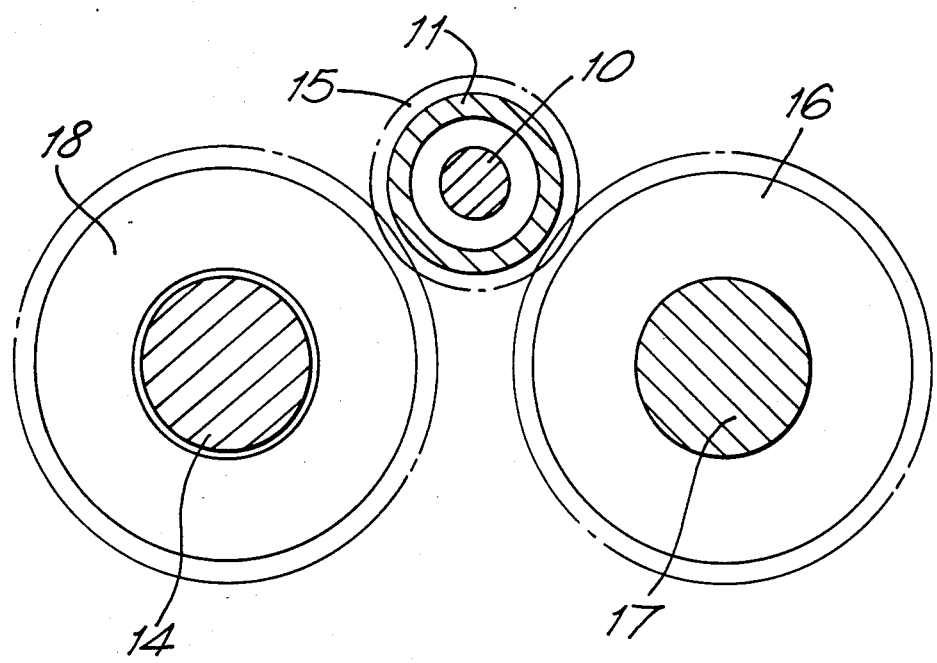
FIG. 4 is a cross section of the transmission of FIG. 1 on line IV—IV in FIG. 1 with shafts repositioned.

In the gearboxes shown the gears on the layshaft may be the same size as the corresponding gears on the output shaft where the output shaft and layshaft are spaced equally from the axis of hollow shafts 11, 20. In that way manufacturing costs can be less as fewer different components are used. FIG. 4 shows a typical configuration of shafts which enables the transmission to be made particularly compact. By arranging the axis of shafts 10 in a different plane from that containing the axis of shafts 14, 17, the shafts 14,17 can be arranged closer together than shown in FIG. 1. The corresponding shafts in FIGS. 2 and 3 can be similarly arranged.

What we claim as our invention and desire to secure by Letters Patent in the United States is:

1. a change speed transmission including gear trains which provide increasing speed ratios and two clutches which are independently operable and provide alternative drive paths through the gear trains between an input and an output, the gear trains providing alternate ratios driven respectively through one and the other clutch said input comprising a first shaft rotatably fast with a driven member of one clutch and a second shaft rotatably fast with a driven member of the other clutch, a layshaft being provided through which drive in a selected ratio is transmitted from one of the first and second shafts to the other of the first and second shafts to drive the output, one of the first and second shafts having a gear thereon which meshes with a gear on the output.

2. A change speed transmission according to claim 1 in which gears rotatably fast with the first shaft and the layshaft are in constant mesh.

3. A change speed transmission according to claim 1 in which the gear fast with the first shaft is in constant mesh with a gear selectively drivably connectable to said output.

4. A change speed transmission according to claim 2 in which the gear fast with the first shaft is in constant mesh with a gear selectively drivably connectable to said output.

5. A change speed transmission according to claim 1 in which gears on the second shaft are in constant mesh with gears which are selectively drivably connectable to said layshaft.

6. A change speed transmission according to claim 1 in which gears on the second shaft are in constant mesh with gears selectively drivably connectable to said output.

7. A change speed transmission according to claim 4 in which gears on the second shaft are in constant mesh with gears selectively drivably connectable to said output.

8. A change speed gearing according to claim 1 in which a reverse ratio gearing is provided comprising a gear on the second shaft which in reverse ratio meshes with a lay gear in mesh with a gear on the output.

9. A change speed transmission according to claim 1 in which a reverse ratio gearing is provided comprising a reverse gear on the layshaft, the reverse gear being in constant mesh with a lay gear which constantly meshes with a gear rotatably fast with said first shaft.

10. A change speed transmission according to claim 9 in which the reverse gear is selectively drivably connectable to a further gear on the layshaft.

11. A change speed transmission according to claim 10 in which said further gear meshes constantly with a gear on said second shaft.

* * * * *